(12) United States Patent
Cartwright et al.

(10) Patent No.: US 6,662,674 B2
(45) Date of Patent: Dec. 16, 2003

(54) STEERING COLUMN

(75) Inventors: Mark A. Cartwright, West Lafayette, IN (US); Jonathan Lewis, Cutler, IN (US); Gregory B. Livengood, Greenfield, IN (US)

(73) Assignee: TRW Inc., Lyndhurst, OH (US)

( * ) Notice: Subject to any disclaimer, the term of this patent is extended or adjusted under 35 U.S.C. 154(b) by 20 days.

(21) Appl. No.: 09/991,431

(22) Filed: Nov. 21, 2001

(65) Prior Publication Data

US 2003/0094061 A1 May 22, 2003

(51) Int. Cl.$^7$ ................................................. B62D 1/18
(52) U.S. Cl. .............................. 74/493; 280/775
(58) Field of Search ............................ 74/493, 492, 494, 74/495, 516, 517, 518; 280/775

(56) References Cited

U.S. PATENT DOCUMENTS

| | | | | |
|---|---|---|---|---|
| 3,504,569 A | * | 4/1970 | Zoltok | 74/493 |
| 3,718,053 A | * | 2/1973 | Cinadr | 74/493 |
| 4,307,626 A | * | 12/1981 | Sanada et al. | 74/493 |
| 4,449,419 A | | 5/1984 | Bruguera | 74/493 |
| 4,554,843 A | | 11/1985 | Andersson | 74/493 |
| 4,656,888 A | | 4/1987 | Schmitz | 74/493 |
| 5,131,287 A | | 7/1992 | Stromberg | 74/493 |
| 5,259,264 A | | 11/1993 | Bodin et al. | 74/493 |
| 5,363,716 A | | 11/1994 | Budzik et al. | 74/493 |
| 5,626,059 A | * | 5/1997 | Bobbitt et al. | 74/493 |
| 6,357,317 B1 | * | 3/2002 | Livengood et al. | 74/493 |
| 2002/0020245 A1 | * | 2/2002 | Gaukel | 74/493 |

* cited by examiner

Primary Examiner—David A. Bucci
Assistant Examiner—Bradley J. Van Pelt
(74) Attorney, Agent, or Firm—Tarolli, Sundheim, Covell & Tummino L.L.P.

(57) ABSTRACT

A steering column (10, 210) includes a support (24, 224) which supports a steering column member for rotation about a longitudinal axis (26, 226). A mounting bracket (50, 266) connects the steering column (10, 210) to a vehicle frame. A pair of arms (66, 68 and 276, 278) interconnects the support (24, 224) and the mounting bracket (50, 266). Each of the arms (66, 68 and 276, 278) has an end (72, 78 and 296, 304) pivotally connected with the mounting bracket (50, 266) and an end (88, 98 and 310, 318) pivotally connected with the support (24, 224). A locking mechanism (108, 330) locks the arms (66, 68 and 276, 278) relative to the mounting bracket (50, 266) and locks the support (24, 224) relative to the arms. The locking mechanism (108, 330) includes a locking shaft (110, 340) extending through the mounting bracket (50, 266), one of the arms (66, 68 and 276, 278), and into the support (24, 224). The locking shaft (110, 340) extends through the one arm (66, 68, and 276, 278) at a location between the ends of the arm.

13 Claims, 5 Drawing Sheets

STEERING COLUMN

FIELD OF THE INVENTION

The present invention relates to a steering column, and more specifically, to an adjustable steering column.

BACKGROUND OF THE INVENTION

A known steering column is disclosed in U.S. Pat. No. 4,449,419. U.S. Pat. No. 4,449,419 discloses a steering column having a fixed bracket connectable to a vehicle. Upper and lower links are pivotally connected to the fixed bracket and to a barrel supporting a steering column member for rotation. A locking shaft extends through the bracket and the upper and lower links. The locking shaft extends through arcuate slots in the lower links and through slots in the upper link.

SUMMARY OF THE INVENTION

A steering column of the present invention includes a steering column member connectable with a steering wheel and rotatable to turn steerable vehicle wheels. A support, through which the steering column member extends, supports the steering column member for rotation about a longitudinal axis of the steering column member. A mounting bracket connects the steering column to a vehicle frame.

A pair of arms interconnect the support and the mounting bracket. Each of the arms has a first end pivotally connected with the mounting bracket to permit pivotal movement of the arms relative to the mounting bracket. Each of the arms has a second end pivotally connected with the support to permit pivotal movement of the support relative to the arms. A locking mechanism locks the arms in any one of a plurality of pivot positions relative to the mounting bracket and locks the support in any one of a plurality of pivot positions relative to the arms. The locking mechanism includes a locking shaft extending through the mounting bracket, one of the arms, and into the support. The locking shaft extends through the one arm at a location between the first and second ends.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF THE INVENTION

Figure 1:
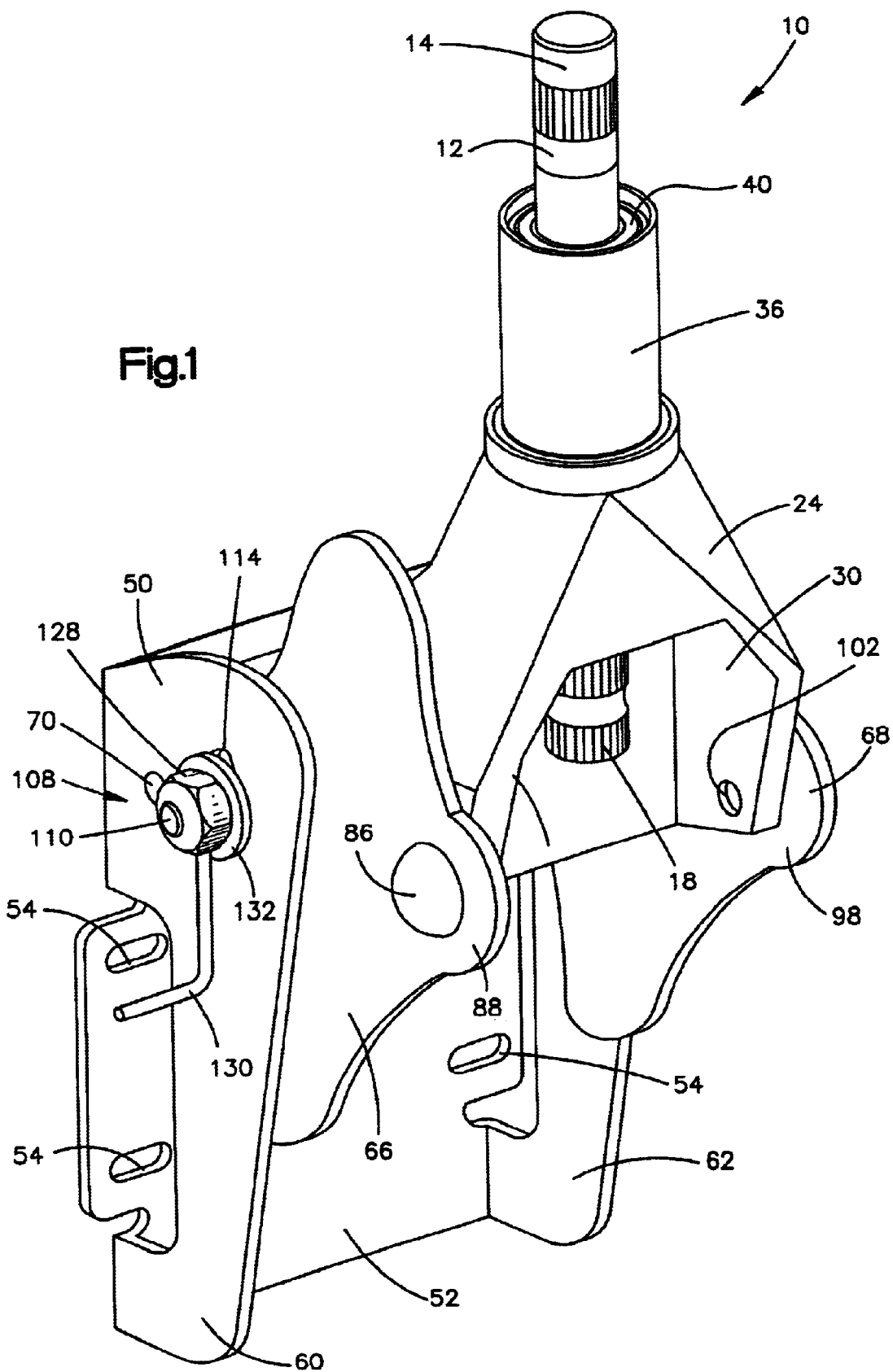
FIG. 1 is a schematic pictorial view of a steering column constructed in accordance with a first embodiment of the present invention.
Figure 2:
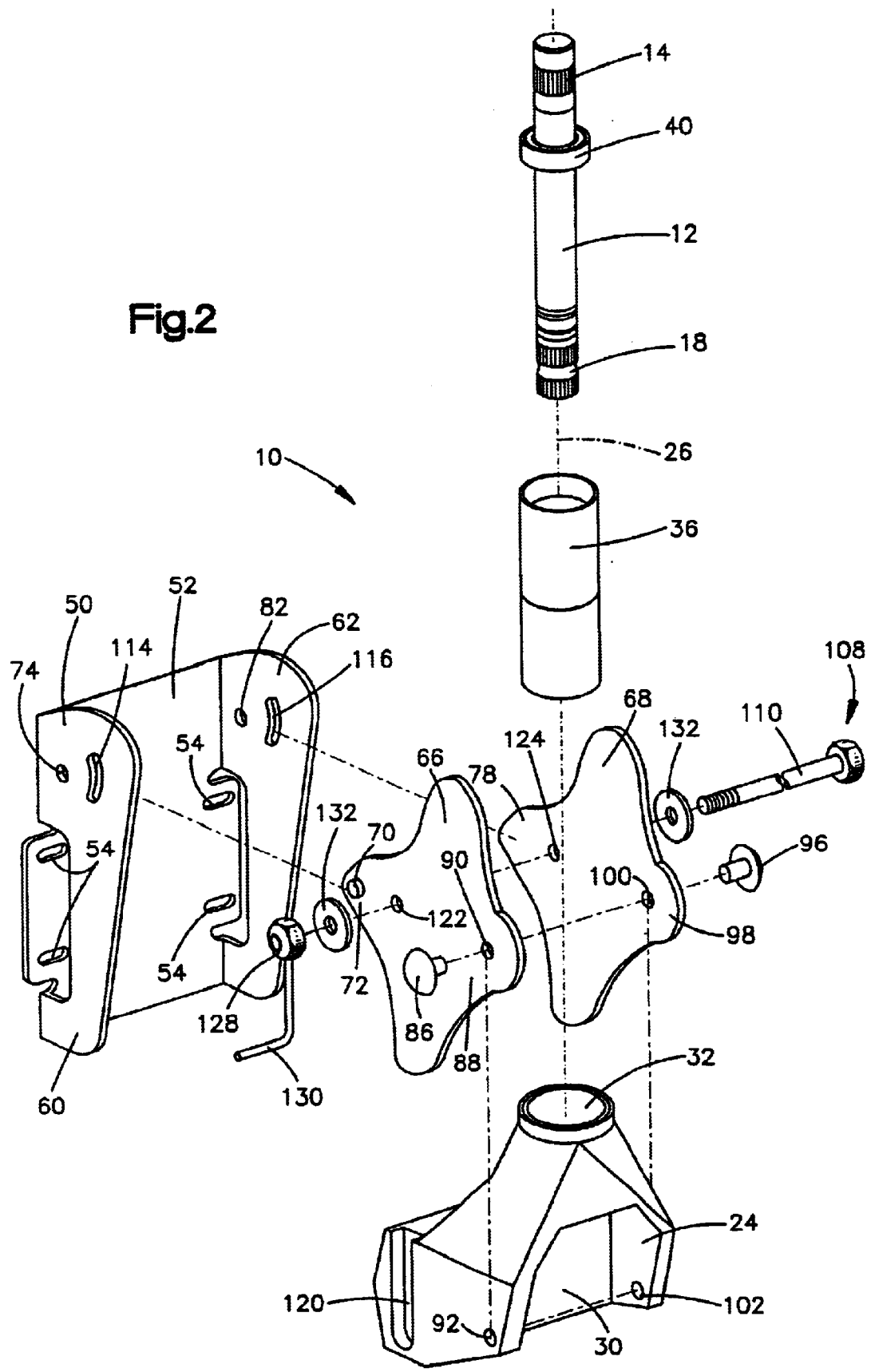
FIG. 2 is an exploded view of the steering column of FIG. 1.

An adjustable vehicle steering column 10 constructed according to a first embodiment of the present invention is illustrated in FIGS. 1 and 2. The steering column 10 includes a rotatable steering column member 12 to turn steerable vehicle wheels (not shown) as is known in the art. The steering column member 12 has an end 14 connectable with a steering wheel (not shown) in manner known in the art.

An end 18 of the steering column member 12 opposite from the end 14 is connectable with a universal joint (not shown). The universal joint connected with the end 18 of the steering column member 12 is connectable with a mechanism designed to transmit movement of the steering column member to a steering gear and permit movement of the steering column member relative to the mechanism, as known in the art.

A support 24 (FIGS. 1 and 2) supports the steering column member 12 for rotation about a longitudinal axis 26 of the steering column member. Upon rotation of the steering wheel, the steering column member 12 rotates about the longitudinal axis 26. Upon rotation of the steering column member 12 about the longitudinal axis 26, steerable vehicle wheels (not shown) are turned, as known in the art.

The support 24 (FIG. 2) has a main body 30 with a passage 32 through which the steering column member 12 extends. The main body 30 is made by casting and may have any desired shape. A tube 36, through which the steering column member 12 extends, is press fit into the passage 32 in the main body 30. A bearing 40 supports the steering column member 12 for rotation about the longitudinal axis 26 relative to the support 24.

A mounting bracket 50 (FIGS. 1 and 2) connects the steering column 10 with a vehicle frame. The mounting bracket 50 has a rear wall 52 with openings 54 for receiving fasteners to connect the mounting bracket to the vehicle frame. The mounting bracket 50 is connected to the vehicle frame using fasteners, such as bolts, as known in the art.

A pair of side walls 60 and 62 extend from the rear wall 52 of the mounting bracket 50. The side walls 60 and 62 extend generally perpendicular to the rear wall 52 and parallel to each other. A pair of arms 66 and 68 (FIGS. 1 and 2) interconnect the support 24 and the mounting bracket 50. The arm 66 (FIG. 2) has a pin 70 extending from an end 72. The pin 70 is received in an opening 74 in the side wall 60 to pivotally connect the arm 66 with the side wall 60. The arm 68 has a pin (not shown) extending from an end 78 of the arm 68 toward the side wall 62. The pin extending from the end 78 is received in an opening 82 in the side wall 62 to pivotally connect the arm 68 with the side wall 62. Accordingly, the arms 66 and 68 can pivot relative to the mounting bracket 50.

A pin 86 (FIGS. 1 and 2) pivotally connects an end 88 of the arm 66 opposite the end 72 to the support 24. The pin 86 (FIG. 2) extends through an opening 90 in the end 88 and into an opening 92 in the support 24. A pin 96 pivotally connects an end 98 of the arm 68 opposite the end 78 with the support 24. The pin 96 extends through an opening 100 in the end 98 and into an opening 102 in the support 24. Accordingly, the support 24 can pivot relative to the arms 66 and 68.

A locking mechanism 108 (FIG. 1) locks the arms 66 and 68 in any one of a plurality of pivot positions relative to the mounting bracket 50. The locking mechanism 108 also locks the support 24 in any one of a plurality of pivot positions relative to the arms 66 and 68. The locking mechanism 108 (FIGS. 1 and 2) includes a locking shaft or bolt 110. The bolt 110 extends through the side walls 60 and 62, the arms 66 and 68, and the support 24.

The bolt 110 (FIG. 2) extends through an arcuate slot 114 in the side wall 60 and an arcuate slot 116 in the side wall 62. The bolt 110 extends through a slot 120 in the support 24. The slot 120 extends parallel to the longitudinal axis 26 of the steering column member 12. The bolt 110 also extends through an opening 122 in the arm 66 and an opening 124 in the arm 68. The opening 122 in the arm 66 is located between the ends 72 and 88 of the arm 66. The opening 124 is located between the ends 78 and 98 of the arm 68.

The locking mechanism 108 includes a nut 128 which is threaded onto the bolt 110. A handle 130 extends from the nut 128. The handle 130 is movable by an occupant of the vehicle to actuate the locking mechanism 108. The bolt 110 extends through a pair of washers 132 which engage the side walls 60 and 62 of the mounting bracket 50. The locking mechanism 108 presses the side walls 60 and 62 toward each other and against the arms 66 and 68 and presses the arms against the support 24 to prevent movement of the support and the arms relative to the mounting bracket 50.

Although the locking mechanism 108 is shown as a bolt 110 with a nut 128, it is contemplated that the locking mechanism may have a different construction. The locking mechanism 108 may have any construction that presses the side walls 60 and 62 against the arms 66 and 68 with sufficient force to prevent movement of the support 24 relative to the mounting bracket 50. It is also contemplated that a mechanism, such as a spring mechanism, may be used to urge the support 24 to pivot in a counter-clockwise direction relative to the arms 66 and 68 and the arms to pivot in a counter-clockwise direction relative to the mounting bracket 50.

Upon pivoting the handle 130 in a counterclockwise direction, as viewed in FIG. 1, the nut 128 is partially unscrewed from the bolt 110. When the nut 128 is unscrewed from the bolt 110, the support 24 may be pivoted relative to the arms 66 and 68 and the arms may be pivoted relative to the mounting bracket 50.

The bolt 110 moves with the arms 66 and 68 relative to the mounting bracket 50 and relative to the support 24. The bolt 110 is engageable with opposite ends of the arcuate slots 114 and 116 and with opposite ends of the slot 120 in the support 24 to limit movement of the support and arms relative to the mounting bracket 50. After the support 24 is positioned relative to the mounting bracket 50, the handle 130 is rotated in a clockwise direction, as viewed in FIG. 1, to cause the nut 128 to be screwed onto the bolt 110. As the nut 128 is screwed onto the bolt 110, the side walls 60 and 62 are pressed towards each other and towards the arms 66 and 68. The arms 66 and 68 and the support 24 are clamped between the side walls 60 and 62 to prevent movement of the support relative to the mounting bracket 50.

Figure 3:
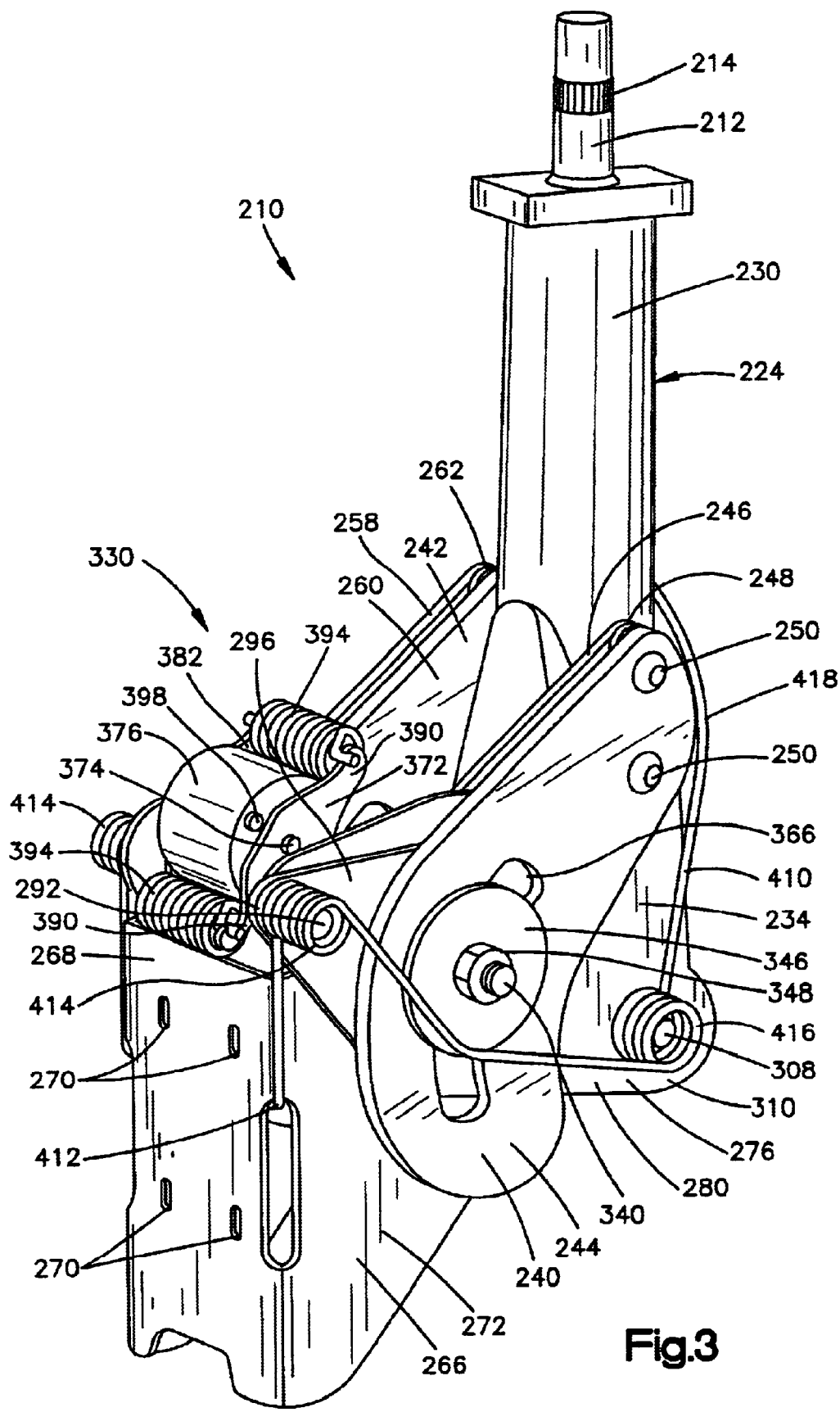
FIG. 3 is a schematic pictorial view of a steering column constructed in accordance with a second embodiment of the present invention.
Figure 4:
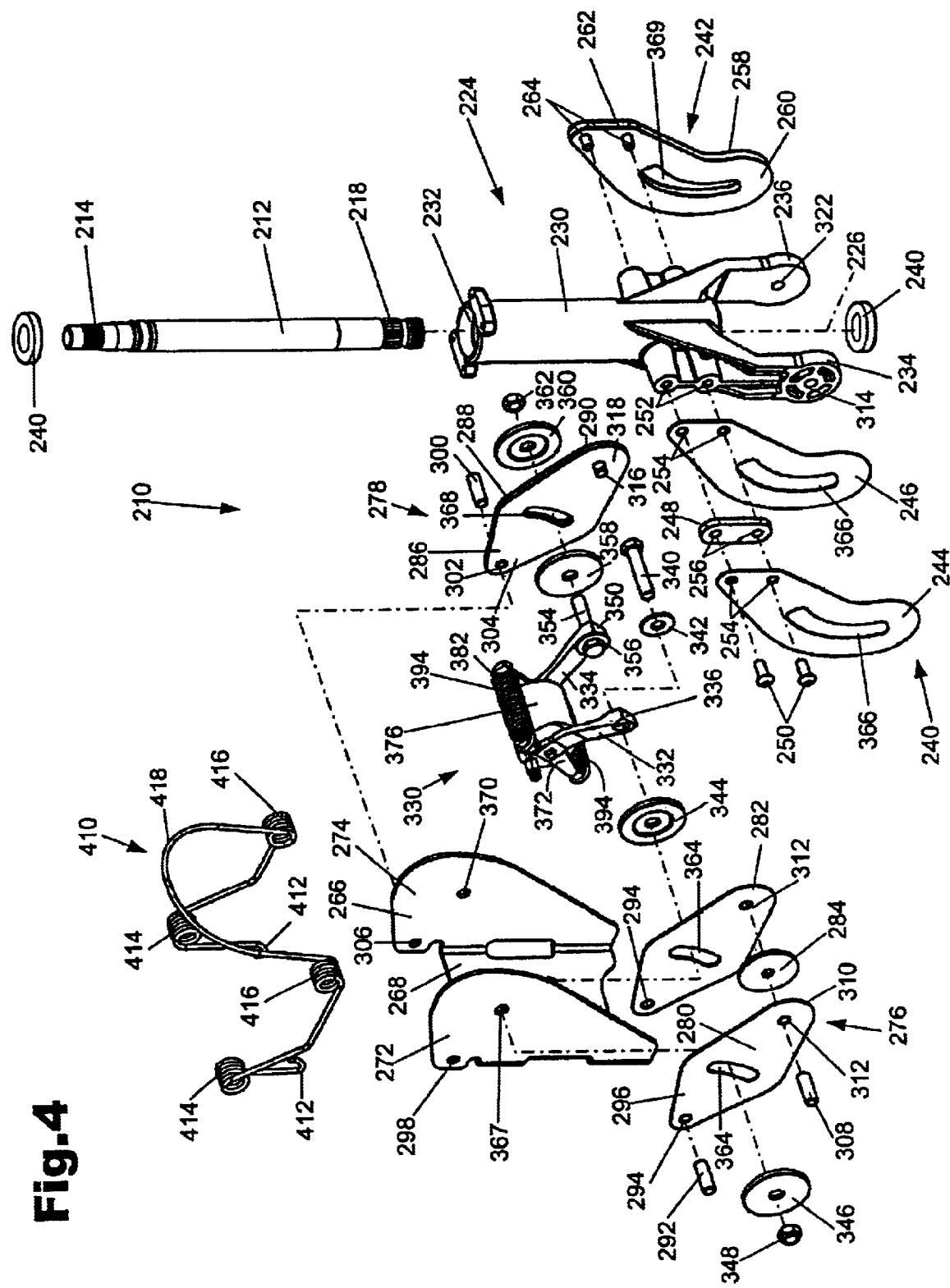
FIG. 4 is an exploded view of the steering column of FIG. 3.

A vehicle steering column 210 constructed according to a second embodiment of the present invention is illustrated in FIGS. 3 and 4. The steering column 210 includes a rotatable steering column member 212 to turn steerable vehicle wheels (not shown). The steering column member 212 has an end 214 connectable with a steering wheel (not shown) in manner known in the art.

An end 218 (FIG. 4) of the steering column member 212 opposite from the end 214 is connectable with a universal joint (not shown). The universal joint connected with the end 218 of the steering column member 212 is connectable with a mechanism designed to transmit movement of the steering column member to a steering gear and permit movement of the steering column member relative to the mechanism, as known in the art.

A support 224 (FIGS. 3 and 4) supports the steering column member 212 for rotation about a longitudinal axis 226 of the steering column member. Upon rotation of the steering wheel, the steering column member 212 rotates about the longitudinal axis 226. Upon rotation of the steering column member 212 about the longitudinal axis 226, steerable vehicle wheels (not shown) are turned, as known in the art.

The support 224 (FIG. 4) has a tubular portion 230 with a passage 232 through which the steering column member 212 extends. Arm portions 234 and 236 extend axially from the tubular portion 230. The tubular portion 230 is made by casting and may have any desired shape. Bearings 240 located in the passage 232 support the steering column member 212 for rotation about the axis 226 relative to the support 224.

The support 224 includes locking portions 240 and 242 extending from opposite sides of the tubular portion 230. The locking portion 240 includes plates 244 and 246 fixedly connected to each other with a spacer 248 between them. The locking portion 240 is fixedly connected to the tubular potion 230 by fasteners 250, such as screws. The fasteners 250 threadably engage openings 252 in the tubular portion 230 and extend through openings 254 in the plates 244 and 246 and through openings 256 in the spacer 248.

The locking portion 242 is identical to locking portion 240 and, therefore, will not be described in detail. The locking portion 242 includes plates 258 and 260 fixedly connected to each other with a spacer 262 between them. The locking portion 242 is fixedly connected to the tubular potion 230 by fasteners 264, such as screws. The fasteners 264 threadably engage openings in the tubular portion 230 and extend through openings in the plates 258 and 260 and through openings in the spacer 262.

A mounting bracket 266 (FIG. 3) connects the steering column 210 with a vehicle frame. The mounting bracket 266 has a rear wall 268 with openings 270 for receiving fasteners to connect the mounting bracket to the vehicle frame. The mounting bracket 266 is connected to the vehicle frame using fasteners, such as bolts, as known in the art.

A pair of side walls 272 and 274 (FIG. 4) extend from the rear wall 268 of the mounting bracket 266. The side walls 272 and 274 extend generally perpendicular to the rear wall 268 and parallel to each other. A pair of identical arms 276 and 278 interconnect the support 224 and the mounting bracket 266. The arm 276 includes a pair of plates 280 and 282 fixedly connected together with a washer 284 between them. The side wall 272 of the mounting bracket 266 extends between the plates 280 and 282. The arm 278 includes a pair of plates 286 and 288 fixedly connected together with a washer 290 between them. The side wall 274 of the mounting bracket 266 extends between the plates 286 and 288.

A pin 292 extends through openings 294 in an end 296 of the arm 276. The pin 292 is received in an opening 298 in the side wall 272 to pivotally connect the arm 276 to the side wall 272. A pin 300 extends through openings 302 in an end 304 of the arm 278. The pin 300 is received in an opening 306 in the side wall 274 to pivotally connect the arm 278 to the side wall 274. Accordingly, the arms 276 and 278 can pivot relative to the mounting bracket 266.

A pin 308 (FIGS. 3 and 4) pivotally connects an end 310 of the arm 276 to the support 224. The pin 308 (FIG. 4) extends through openings 312 in the end 310 and the washer 284 and into an opening 314 in the arm portion 234 of the support 224. A pin 316 pivotally connects an end 318 of the arm 278 with the arm portion 236 of the support 224. The pin 316 extends through openings in the end 318 and the washer 290 and into an opening 322 in the support 224. Accordingly, the support 224 can pivot relative to the arms 276 and 278.

Figure 5:
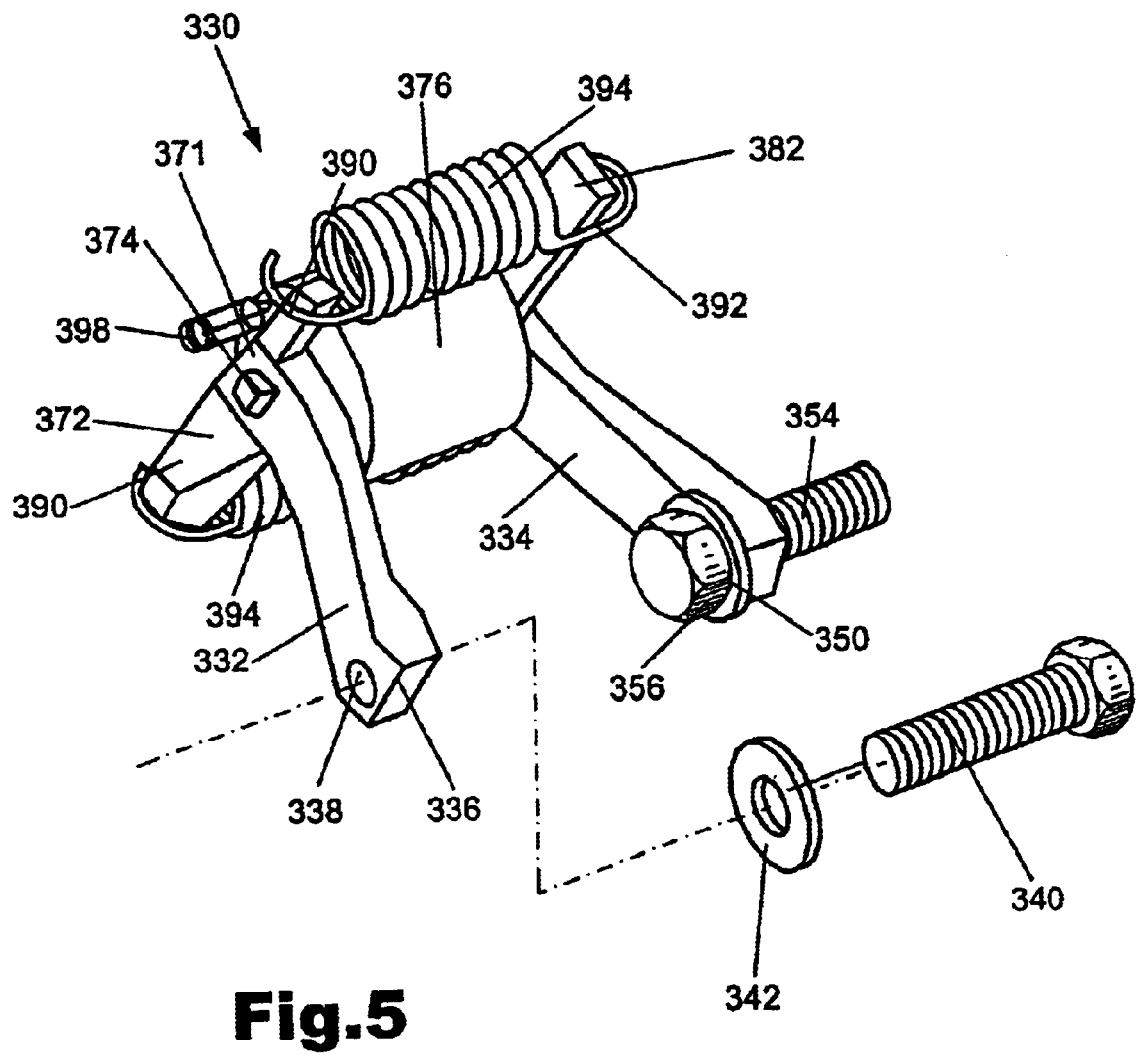
FIG. 5 is an enlarged view of a locking mechanism of the steering column of FIG. 4.

A locking mechanism 330 (FIGS. 3–5) locks the arms 276 and 278 in any one of a plurality of pivot positions relative to the mounting bracket 266. The locking mechanism 330 also locks the support 224 in any one of a plurality of pivot positions relative to the arms 276 and 278. The locking mechanism 330 applies a force to clamp the arm 276 and the side wall 272 of the mounting bracket 266 between the plates 244 and 246 of the locking portion 240 of the support 224. The locking mechanism 330 also clamps the arm 278 and the side wall 274 of the mounting bracket 266 between the plates 258 and 260 of the locking portion 242 of the support 224.

The locking mechanism 330 (FIGS. 4 and 5) includes locking levers 332 and 334 that apply a force to the plates 246 and 260 of the locking portions 240 and 242 of the support 224. The locking lever 332 (FIG. 5) has an end 336 with an opening 338 through which a locking shaft or bolt 340 extends. The bolt 340 (FIG. 4) also extends through washers 342, 344 and 346. The washer 344 is located between the end 336 and the plate 246 of the support 224. A nut 348 threadably engages the bolt 340 and presses the washer 346 against the plate 244 of the support 224. The locking lever 334 (FIG. 5) has an end 350 with an opening through which a locking shaft or bolt 354 extends. The bolt 354 (FIG. 4) also extends through washers 356, 358 and 360. The washer 358 is located between the end 350 and the plate 260 of the support 224. A nut 362 threadably engages the bolt 354 and presses the washer 360 against the plate 258 of the support 224.

The locking shaft 340 extends through arcuate slots 364 in the arm 276 and arcuate slots 366 in the locking portion 240 of the support 224. The arcuate slots 364 in the arm 276 are located between the ends 296 and 310 of the arm 276. The locking shaft 340 also extends through opening 367 in the side wall 272 of the mounting bracket 266. The locking shaft 354 extends through arcuate slots 368 in the arm 278 and arcuate slots 369 in the locking portion 242 of the support 224. The arcuate slots 368 in the arm 278 are located between the ends 304 and 318 of the arm 278. The locking shaft 354 also extends through opening 370 in side wall 274 of the mounting bracket 266.

The locking lever 332 (FIG. 5) has an end 371 connected with a cross member 372 and a piston 374 extending into a cylinder 376. The locking lever 334 has an end (not shown) opposite from the end 350 connected with a cross member 382 and the cylinder 376. The cross member 372 has opposite ends 390 and the cross member 382 has opposite ends 392. Coil springs 394 extend between the ends 390 and 392 of the cross members 372 and 382. The springs 394 apply a force to pull the end 371 of the locking lever 332 toward the end of the locking lever 334 opposite from the end 350 to move the ends 336 and 350 away from each other. Accordingly, the ends 336 and 350 (FIG. 4) of the locking levers 332 and 334 apply force to the plates 246 and 260 of the locking portions 240 and 242 to clamp the arms 276 and 278 and the side walls 272 and 274 between the plates 244, 246 and plates 258, 260 of the support 224.

The cylinder 376 (FIG. 5) has a port 398 for receiving a pressurized fluid, such as air. The pressurized fluid moves the piston 374 and the cylinder 376 relative to each other against the force of the springs 394. Accordingly, when the pressurized fluid is applied to the piston 374, the force applied by the springs 394 is released and the steering column 212 can be positioned relative to the mounting bracket 266.

Although the locking mechanism 330 is shown as a pair of locking levers 332 and 334 with the piston 374 and the cylinder 376, it is contemplated that the locking mechanism may have a different construction. The locking mechanism 330 may have any construction that clamps the arms 276 and 278 and the side walls 272 and 274 between the plates 244, 246 and 258, 260 of the locking portions 240 and 242 with sufficient force to prevent movement of the support 224 relative to the mounting bracket 266.

A spring member 410 (FIGS. 3 and 4) urges the support 224 to pivot in a counter-clockwise direction relative to the arms 276 and 278 and the arms to pivot in a counter-clockwise direction relative to the mounting bracket 266. The spring member 410 has ends 412 that engage the mounting bracket 266 to connect the spring member to the mounting bracket. Coiled portions 414 of the spring member 410 extend around and engage the pins 292 and 300. Coiled portions 416 extend around and engage the pins 308 and 316. A curved portion 418 of the spring member 410 extends between the coiled portions 416 and engages the support 224. The spring member 410 urges the steering column 210 into an out of the way position. Although the spring member 410 is shown as having coiled portions 414 and 416 and curved portion 418, it is contemplated that any mechanism may be used to urge the steering column 210 to the out of the way position. It is also contemplated that the steering column 210 may not be urged to the out of the way position.

When pressurized fluid is applied to the cylinder 376, the end 371 of the locking lever 332 and the end of the locking lever 334 opposite the end 350 are moved away from each other and the ends 336 and 350 are moved toward each other. When the ends 336 and 350 are moved toward each other, the support 224 may be pivoted relative to the arms 276 and 278 and the arms may be pivoted relative to the mounting bracket 266.

The arms 276 and 278 move relative to the bolts 340 and 354 and the mounting bracket 266. The locking portions 240 and 242 of the support 224 also move relative to the bolts 340 and 354 and the mounting bracket 266. The bolts 340 and 354 are engageable with opposite ends of the arcuate slots 364, 368 in the arms 276 and 278 and with opposite ends of the arcuate slots 366, 369 in the locking portions 240 and 242 of the support 224 to limit movement of the support and arms relative to the mounting bracket 266. After the support 224 is positioned relative to the mounting bracket 266, the pressurized fluid is released from the cylinder 376 to cause the end 371 of the locking lever 332 and the end of the locking lever 334 opposite the end 350 to move toward each other and the ends 336 and 350 to move away from each other. As the ends 336 and 350 move away from each other, the arms 276 and 278 and the side walls 272 and 274 are clamped between the plates 244, 246 and plates 258, 260 of the locking portions 240 and 242 of the support 224. The arms 276 and 278 and the side walls 272 and 274 are clamped to prevent movement of the support 224 relative to the mounting bracket 266.

From the above description of the invention, those skilled in the art will perceive improvements, changes and modifications. Such improvements, changes and modifications within the skill of the art are intended to be covered by the appended claims.

Having described the invention, the following is claimed:

1. A steering column comprising:
   a steering column member connectable with a steering wheel and rotatable to turn steerable vehicle wheels;
   a support through which said steering column member extends supporting said steering column member for rotation about a longitudinal axis of said steering column member;

a mounting bracket which connects said steering column to a vehicle frame;

a pair of arms interconnecting said support and said mounting bracket, each of said arms having a first end pivotally connected with said mounting bracket to permit pivotal movement of said arms relative to said mounting bracket, each of said arms having a second end pivotally connected with said support to permit pivotal movement of said support relative to said arms; and a locking mechanism which locks said arms in any one of a plurality of pivot positions relative to said mounting bracket and locks said support in any one of a plurality of pivot positions relative to said arms, said locking mechanism including a locking shaft extending through said mounting bracket, one of said arms, and into said support, said locking shaft extending through said one of said arms at a location between said first and second ends of said one of said arms.

2. A steering column as defined in claim 1 wherein said mounting bracket includes first and second side walls extending parallel to each other, each of said arms being pivotally connected to one of said first and second side walls.

3. A steering column as defined in claim 2 wherein said locking mechanism presses said arms between said side walls and said support to prevent movement of said arms relative to said mounting bracket and said support relative to said arms.

4. A steering column as defined in claim 2 wherein said locking shaft extends through an arcuate slot in each of said first and second side walls.

5. A steering column as defined in claim 1 wherein said locking shaft extends into a slot in said support.

6. A steering column as defined in claim 5 wherein said slot extends in a longitudinal direction parallel to said longitudinal axis of said steering column member.

7. A steering column as defined in claim 5 wherein said support is made of a one-piece casting.

8. A steering column as defined in claim 1 wherein each of said arms includes a first plurality of plates.

9. A steering column as defined in claim 8 wherein said support includes a second plurality of plates, said locking shaft extending through said second plurality of plates.

10. A steering column as defined in claim 9 wherein said arms and said side walls of said mounting bracket extend between first and second plates of said second plurality of plates.

11. A steering column as defined in claim 10 wherein said locking mechanism presses said first and second plates together to clamp said arms and said side walls between said first and second plates.

12. A steering column as defined in claim 1 wherein said one of said arms has an arcuate slot through which said locking shaft extends.

13. A steering column as defined in claim 12 wherein said support has an arcuate slot through which said locking shaft extends.

* * * * *